Patented Apr. 23, 1935

1,999,159

UNITED STATES PATENT OFFICE 1,999,159

PROCESS OF ABSORBING CARBON MONOXIDE AND/OR DIOLEFINES FROM GASES OR VAPORS

Adrianus Johannes van Peski, Amsterdam, Netherlands, assignor to Shell Development Company, San Francisco, Calif., a corporation of Delaware No Drawing. Application November 1, 1930, Serial No. 492,867. In the Netherlands November 6, 1929

7 Claims. (Cl. 260—171)

My invention relates to a process of absorbing carbon monoxide and/or diolefines from gases and vapors, whereby these compounds if desired are obtained in a pure condition.

It is known that carbon monoxide can be absorbed both in a hydrochloric acid and in an ammoniacal cuprochloride solution, and that diolefines can be absorbed only in a hydrochloric acid cuprochloride solution. The cuprochloride forms with these substances an addition-compound easily decomposable by a gentle heating process, as a result of which the carbon monoxide or the diolefine is liberated again. Objections can be raised against either of these absorption methods: on the one hand the use of acid solutions is less recommendable in the technique from the point of view of the apparatus, on the other hand at the regeneration of the ammoniacal cuprochloride solution a quantity of ammonia is invariably carried off as well; the recovery thereof, as also the restoring of the solution to the required ammonia concentration call for special measures, apparatus, etc. preferably to be avoided.

For this reason, in so far as the absorption of carbon monoxide is concerned, efforts have been made for the cuprochloride to be applied in a neutral solution of alkali metal or alkaline earth metal chlorides. These solutions, it is true, are highly absorptive with regard to CO, but cannot be considered for application in practice because they are very unstable when exposed to the air, a thick greenish white precipitate of basic cuprisalt then forming very rapidly. In view of cuprisalts having no absorptive property a similar solution soon becomes useless. Now the invention provides the means whereby the use of neutral cuprosalt solutions is technically rendered possible for the purpose mentioned.

In principle my invention consists in the gases or vapors being brought into contact with a neutral cuprosalt solution containing a substance which prevents the formation of cuprisalt. Thus, for instance, according to the invention a small quantity of a reducing agent, such as hydroxylamine hydrochloride, sulphite, stannichloride and the like, can be added to the absorption liquid. These substances tend to directly convert any cuprisalt formed into cuprosalt, thus causing the respective solutions to remain perfectly clear. Naturally this activity lasts only as long as there is some reducing agent present in the solution.

As neutral solvents for the cuprosalt, for example alkali metal or alkaline earth metal chlorides are used, dissolved in a suitable neutral liquid, e. g. water or alcohol. The magnesium halide may also be used.

An absorption liquid according to the invention may, for instance, be prepared as follows:

10 g. CuCl are dissolved at 10°–15° C. in 20 g. NH$_4$Cl and 150 c. c. water, after which 0.5 to 1 g. of one of the above-mentioned reducing agents is added. This solution is left intact in a closed vessel for an unlimited period.

The absorptive property of the solutions according to the invention equals that of the known hydrochloric and ammoniacal cuprosalt solutions, i. e. maximum 1 mol. CO to 1 mol. Cu. In the event of a gas or vapor containing only small quantities of CO or diolefines it is recommendable to carry out the absorption under elevated pressure.

The regeneration of the used absorption liquid, whereby the absorbed compounds are obtainable in a pure condition, can be very easily effected by heating above room temperature, e. g. 40–80° C., whereby the solution is not changed. It may sometimes be advantageous to expel the absorbed compounds only by a reduction of pressure, whilst these two measures may also be applied in combination with each other. In the case of mixtures of CO and one or more diolefines or mixtures of diolefines being absorbed these may be recovered in a separated condition by fractionated expansion.

The addition-product of the cuprosalt and the carbon monoxide or the diolefines sometimes precipitates in a fine crystalline state. If it is desired to prevent the formation of such a precipitate, which in practice may give rise to clogging, it is advisable to carry out the absorption process at temperatures above 10° C. and furthermore to use concentrated solutions. Moreover the addition product appears to be more readily precipitatable according as the quantity of alkali metal or alkaline earth metal chloride used for the solution is smaller.

Thus for instance the CO addition product precipitates from a solution of 20 g. CuCl (1 mol), 40 g. NH$_4$Cl (4 mol) and 150 cc. water, whereas no precipitate is formed in a solution containing equal quantities of the said salts in 130 cc. water.

According to the invention it is possible, however, in all cases to prevent the precipitation of the carbon monoxide addition product by the addition of an acid amide, e. g. urea, acetamide and the like. For the absorption of diolefines alone the addition of an acid amide has no special advantage.

As examples of cuprosalts to be used cuprochloride or cuproformiate may be mentioned. As a solvent various liquids come into consideration, capable of dissolving the respective alkali metal or alkaline earth metal chloride, e. g. water or alcohol.

It is recommendable to prevent the iron from coming into contact with the absorption liquid, in view of the copper precipitating thereby. The apparatus can be made of precious steels, lead and the like, the risk of a separation of copper being thereby avoided.

Example I

A solution of 10 g. CuCl, 24 g. NaCl, 1 g. $NH_2OH.HCl$ in 150 cc. water yields a clear brown liquid which is stable during a long time. At 5° C. this solution easily absorbs 1100 cc. CO. Upon the solution being subsequently heated to 40–60° C. the CO is completely expelled and the solution can be used again.

Example II 20 g. CuCl, 40 g. $NH_4Cl$, 1 g. ammoniumsulphite dissolved in 150 cc. water absorb 3300 cc. CO, a crystalline precipitate being thereby formed. When starting from the same solution, to which besides 24 g. urea is added, an equal amount of CO is absorbed, whilst the liquid now remains entirely clear.

Example III 10 g. CuCl, 11 g. $CaCl_2$ dissolved in 120 cc. dry alcohol to which 1 g. $NH_2OH$ is added, yields an absorption liquid capable of absorbing 2000 cc. CO.

Example IV 10 g. CuCl, 30 g. $NH_4Cl$, 1 g. $NH_2OH.HCl$, 5 g. acetamide and 100 cc. water yield a clear liquid capable of absorbing 1400 cc. CO without formation of a precipitate.

Example V

Butadiene, prepared in known manner by passing cyclohexane along a glowing platinum wire, was mixed with an equal volume of butane and this mixture was passed at 0° C. through a solution consisting of 10 g. CuCl, 20 g. $NH_4Cl$, 1 g. $SnCl_2$ and 100 cc. water. A precipitate was formed at once. The total quantity passed through was 2.1 litres, 1 litre of which was absorbed. The evading gases still contained 3% butadiene. The addition product was filtered off and gently heated, whereby the butadiene was entirely recovered in a very pure condition.

The absorption of diolefines or mixtures of diolefines and carbon monoxide according to my invention can also be carried out in the neutral liquids described without any reducing agent being added, provided no air or other media which might cause oxidation of the cuprosalt being present. In either case, whether a reducing agent is added to the neutral liquid or air or other medium which might cause oxidation of the cuprosalt is excluded therefrom, non-oxidizing conditions are obtained and the solution is thus kept clear of objectionable cuprisalts. Accordingly, in the claims, where reference is made to "non-oxidizing conditions" such conditions are meant as are obtained by the addition of a small quantity of a reducing agent to the absorption liquid or by the exclusion of oxidizing media.

I claim as my invention:

1. Process for the absorption of carbon monoxide and diolefines from gases containing at least one of these compounds, characterized by said gases being brought into contact with a neutral solution of a cuprosalt and an alkali metal halide capable of functioning as an absorption liquid, while maintaining said solution under non-oxidizing conditions.

2. Process according to claim 1 and further characterized by the absorption liquid containing an acid amide.

3. Process of preparing carbon monoxide and diolefines in a pure condition from gases containing mixtures of said compounds, characterized by the said gases being contacted with a neutral solution of a cuprosalt capable of functioning as an absorption liquid, while maintaining said solution under non-oxidizing conditions, and subsequently expelling the absorbed compounds in a separated condition by means of fractionated expansion.

4. Process of absorbing at least one diolefine from gases, characterized by these gases being contacted with a neutral cuprosalt solution capable of functioning as an absorption liquid, in the absence of oxidizing media.

5. Process of absorbing mixtures of at least one diolefine and carbon monoxide from gases, characterized by these gases being contacted with a neutral cuprosalt solution capable of functioning as an absorption liquid, in the absence of oxidizing media.

6. Process for the absorption of carbon monoxide and diolefines from gases containing at least one of these compounds, characterized by said gases being brought into contact with a neutral solution of a cuprosalt and an alkali metal salt capable of functioning as an absorption liquid and containing a small quantity of a reducing agent.

7. Process according to claim 6 and further characterized by the absorption liquid containing an acid amide.

ADRIANUS JOHANNES VAN PESKI.